United States Patent
Rajwat et al.

(10) Patent No.: US 10,476,987 B2
(45) Date of Patent: Nov. 12, 2019

(54) RETRIEVING INFORMATION ABOUT AN ONLINE SYSTEM USER FOR USE BY AN APPLICATION DURING RETRIEVAL AND INSTALLATION OF THE APPLICATION

(71) Applicant: Facebook, Inc., Menlo Park, CA (US)

(72) Inventors: Paresh Jayant Rajwat, San Jose, CA (US); Asad K. Awan, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 392 days.

(21) Appl. No.: 14/852,414

(22) Filed: Sep. 11, 2015

(65) Prior Publication Data

US 2017/0078444 A1 Mar. 16, 2017

(51) Int. Cl.
*H04L 29/08* (2006.01)
*G06F 8/61* (2018.01)
*G06F 9/445* (2018.01)

(52) U.S. Cl.
CPC .............. *H04L 67/34* (2013.01); *G06F 8/61* (2013.01); *G06F 9/4451* (2013.01); *H04L 67/20* (2013.01)

(58) Field of Classification Search
CPC ....... H04L 67/34; H04L 67/20; G06F 9/4451; G06F 8/61
See application file for complete search history.

(56) References Cited

U.S. PATENT DOCUMENTS

| | | | |
|---|---|---|---|
| 9,058,230 B1* | 6/2015 | van Rietschote | G06F 8/61 |
| 2009/0031301 A1* | 1/2009 | D'Angelo | G06Q 10/10 |
| | | | 717/178 |
| 2013/0030901 A1* | 1/2013 | Eichstaedt | G06Q 30/0207 |
| | | | 705/14.26 |
| 2013/0282806 A1* | 10/2013 | Steinberg | G06Q 50/01 |
| | | | 709/204 |
| 2014/0075338 A1* | 3/2014 | Lifshitz | H04L 67/20 |
| | | | 715/753 |
| 2015/0026675 A1* | 1/2015 | Csaszar | G06F 8/61 |
| | | | 717/178 |
| 2016/0350094 A1* | 12/2016 | Lee | G06F 8/61 |

* cited by examiner

*Primary Examiner* — Chris Parry
*Assistant Examiner* — Caroline H Jahnige
(74) *Attorney, Agent, or Firm* — Fenwick & West LLP (57) ABSTRACT

An online system receives a request to install an application on a client device associated with a user of the online system and initiates retrieval of the application by the client device for installation. While the client device retrieves the application, the online system presents the user with a user interface for receiving information about the user for use by the application. Information provided via the user interface is stored by the online system, which generates a link for launching the application and communicating the stored information to the application. When the application has been installed on the client device, the online system sends the link to the client device for presentation to the user. When the user interacts with the link to launch the application, stored information identified by the link is communicated to the application.

17 Claims, 4 Drawing Sheets

RETRIEVING INFORMATION ABOUT AN ONLINE SYSTEM USER FOR USE BY AN APPLICATION DURING RETRIEVAL AND INSTALLATION OF THE APPLICATION

BACKGROUND

This disclosure relates generally to online systems, and more specifically to presenting content to online system users.

Online systems, such as social networking systems, allow users to connect to and to communicate with other users of the online system. Users create profiles on an online system that are tied to their identities and include information about the users, such as interests and demographic information. The users may be individuals or entities such as corporations or charities. Because of the increasing popularity of online systems, and the significant amount of user specific information maintained by online systems, an online system provides an ideal forum for users to easily communicate information about themselves to other users and share content with other users. For example, users may share their interests with other users by posting content to the online system that is subsequently maintained by the online system and presented to additional users. Content provided to the online system by a user may be declarative information provided by a user, status updates, check-ins to locations, images, photographs, videos, text data, or any other information a user wishes to share with additional users of the online system.

An online system also allows users to deliver, access, or interact with various applications provided by the online system or by third party systems via the online system. Many third party systems provide applications that exchange information with online systems to leverage the popularity of online systems and provide users with enhanced application functionality, while increasing a number of users capable of interacting with the applications. For example, many computer games interface with an online system, allowing online system users to share in gameplay with additional online system users and to communicate with each other regarding in-game actions. Additionally, leveraging the large amounts of descriptive information an online system maintains about its users allows an application to provide a broader range of functionality and allows an entity associated with the application (e.g., a third party system, the online system) to better identify users who are likely to interact with the application.

An entity providing an application, such as a third party system or an online system, often requests information about a user who is installing an application to enhance the user's interactions with the application. For example, a user completes a registration process when installing an application that provides the entity providing the application with information describing the user. For example, an application allows a user to register to use the application by providing information about the user, such as demographic information, which the application uses to provide an experience tailored for the user. As a specific example, a computer game with which a user has registered presents the user with characters in the game that share certain demographic traits with the user. Receiving information from the user also allows an entity associated with the application to maintain data for identifying characteristics of additional users who may be interested in the application as well as data identifying usage of the application by various users. For example, providing certain information describing users installing and using the application allows an entity associated with the application to improve functionality of the application or to identify characteristics of users likely to interact with the application.

However, many users often do not complete a registration process when installing or using an application in some circumstances, such as when the registration process occurs at an inopportune time. For example, if a user is invited provide information via a registration process after the application has been installed on a client device and is ready for use, the user often opts to immediately use the application without completing the registration process. While information typically requested during an application registration process is information that is commonly stored on an online system (e.g., in association with a user's profile on the online system), many users specify privacy settings to the online system that prevent the online system from sharing the information stored by the online system with the application without the user's explicit permission. For example, privacy settings enforced by an online system to protect a user's privacy prevent the online system from freely sharing information describing the user with the application or with other entities. Accordingly, an application or an entity associated with the application may not receive information associated with a user that would improve the user's interaction with the application.

SUMMARY

To improve interaction with applications obtained via an online system, the online system presents a user with a feed of content (or content feed) including a plurality of content items and including a link for installing an application on a client device associated with the user. For example, content items in the content feed describe actions performed by other users of the online system, and the content feed includes an advertisement for an application provided via the online system that includes a link (e.g., a clickable image, text box or button) for installing the application on a client device presenting the content feed. If the user interacts with the link (e.g., clicks or taps on the link), a portion of a display area of the client device presents an interface for downloading the application. For example, a popup interface including information about the application and a link to download or otherwise retrieve the application is superimposed on a portion of the content feed presented by the client device.

In various embodiments, the interface is generated by a third party system external to the online system (e.g., a third party system associated with the application) and provided to the online system for presentation via the online system. For example, the interface is provided to the online system by an application distributor for presentation to an online system user via an application associated with the online system that presents content on a client device. In some embodiments, the third party system interface is provided by the third party system to an application associated with the online system and executing on a client device associated with the user that presents content form the online system. The online system may enforce various permissions or policies to regulate the content of the interface provided by the third party system. If the user interacts with the link presented via the interface, the client device retrieves the application and installs the application on the client device.

While the application is being retrieved and installed on the client device, the online system presents the user with a user interface (e.g., a user fillable form) to provide the online system with information describing the user for using the application. For example, as the application is being retrieved, a popup user interface having a plurality of user input fields (e.g., textboxes, dropdown lists, radio buttons, checkboxes, etc.) is presented to the user in a portion of a display area of the client device retrieving the application for providing the online system with information describing the user for the user to use the application. In some embodiments, the user interface is superimposed on a portion of the content feed presented in the display area of the client device.

In various embodiments, the online system receives information provided by the user via the user interface and also obtains one or more permissions from the user regarding sharing of information associated with the user and maintained by the online system with the application or with a third party system associated with the application. In some embodiments, one or more fields in the user interface may be prefilled with information by the online system. For example, certain information associated with the user by the online system (e.g., user's name, email address, sex, location, etc.) is automatically included in certain fields of the user interface by the online system when the user interface is presented to the user. The user may modify the information automatically included in various fields in some embodiments. Additionally, the user interface is associated with an interaction that, when performed by the user, submits information included in the user interface to the online system. For example, the user interface includes a link that, when selected or accessed, communicates information in the user interface to the online system, which may store the information from the user interface in association with the user.

In various embodiments, the online system communicates with the client device while the application is being retrieved and installed on the client device to determine the status of retrieval or installation of the application. For example, the online system polls a native operating system executing on the client device when the client device begins retrieving the application and continues polling the native operating system until the online system receives an indication form the native operating system that the application has been installed on the client device. In some embodiments, the online system displays an icon or graphic (e.g., a progress bar) to the user describing progress of the retrieval and installation of the application on the client device.

When the client device completes retrieval and installation of the application, the client device communicates an indication to the online system that the application has been installed. In response to receiving the indication that the application has been installed on the client device or to otherwise determining the application has been installed on the client device, the online system generates a link to the application and communicates the link to the application to the client device for presentation to the user. When the user interacts with the presented link, the client device launches the application. For example, the online system generates a deep link to the application that includes an identifier associated with the application and one or more instructions for execution by the application to configure the application to a specific state. A state of the application identifies data received by the application as well as data presented by the application. In various embodiments, the generated link includes information provided to the online system via the user interface, allowing information from the user interface to be communicated to the application when the user interacts with the link to launch the application.

In some embodiments, the online system includes authentication information (e.g., an access token) in the link that grants certain permissions to the application for retrieving specific information about the user from the online system (e.g., information stored in a user profile maintained by the online system). When the user interacts with the link to launch the application, the authentication information is passed to the application, which may then retrieve information about the user from the online system using the authentication information. For example, when the user clicks on the link to launch the application, an access token is communicated to the application, which includes the access token in subsequent requests to the online system for information about the user. If the access token identifies permissions authorizing communication of requested information to the application or to a third party associated with the application, the online system communicates the requested information to the application or to the third party system associated with the application.

Information communicated by the online system to the application via the link or in response to an a limit authenticated request from the application includes information provided to the online system by the user through the user interface presented while the application was retrieved and installed and may also include other information about the user. Depending on permissions specified by the user via the user interface or permissions previously specified by the user and stored by the online system (e.g., privacy settings), the online system provides different amounts of information about the user to the application. For example, one or more permissions specified by the user limit communication of certain information provided by the user to the application. In some embodiments, the online system provides additional information to the application to supplement information provided by the user through the user interface presented during retrieval and installation of the application. The online system may allow the application to retrieve information associated with the information, such as information provided by the user via the user interface, when the application launches and use the retrieved information to determine if the user is authorized to access the application.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
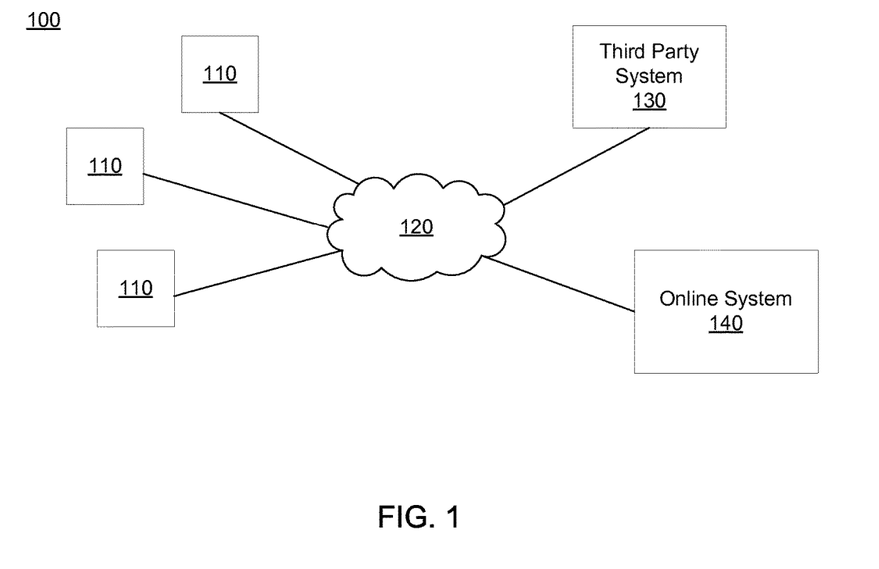
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to online systems that are social networking systems, content sharing networks, or other systems providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, a smartwatch or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device 110. In other embodiments, a third party system 130 provides content or other information for presentation via a client device 110. A third party system 130 may also communicate information to the online system 140, such as advertisements, content, or information about an application provided by the third party system 130.

Figure 2:
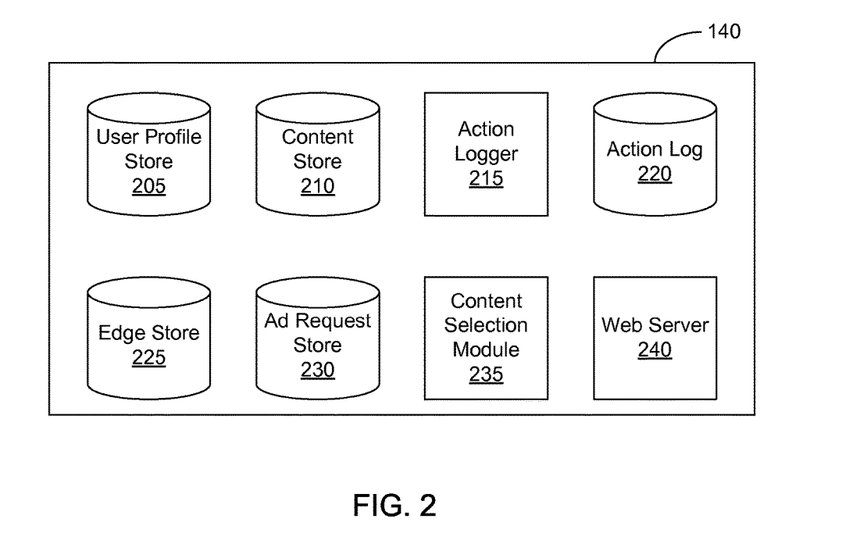
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an ad request store 230, a content selection module 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity. In some embodiments, the brand page associated with the entity's user profile may retrieve information from one or more user profiles associated with user who have interacted with the brand page or with other content associated with the entity, allowing the brand page to include information personalized to a user when presented to the user.

The content store 210 stores objects that each represents various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220. The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

In some embodiments, the action logger 215 receives communications about user actions with content presented to a user and populates the action log 220 with information about the actions. Examples of interactions with content include viewing content items, requesting additional content items for presentation, indicating a preference for a presented content item, sharing a content item with another user, or performing any other suitable action. A user may interact with content items by providing inputs to a client device 110 presenting content from the online system 140. The client device 110 identifies actions corresponding to various provided inputs and communicates information describing the identified actions to the action logger 215, which stores the information describing the identified actions in the action log 220.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An ad request includes advertisement content, also referred to as an "advertisement," and a bid amount. The advertisement content is text, image, audio, video, or any other suitable data presented to a user. In various embodiments, the advertisement content also includes a landing page specifying a network address to which a user is directed when the advertisement content is accessed. The bid amount is associated with an ad request by an advertiser and is used to determine an expected value, such as monetary compensation, provided by an advertiser to the online system 140 if advertisement content in the ad request is presented to a user, if the advertisement content in the ad request receives a user interaction when presented, or if any suitable condition is satisfied when advertisement content in the ad request is presented to a user. For example, the bid amount specifies a monetary amount that the online system 140 receives from the advertiser if advertisement content in an ad request is displayed. In some embodiments, the expected value to the online system 140 of presenting the advertisement content may be determined by multiplying the bid amount by a probability of the advertisement content being accessed by a user.

Additionally, an ad request may include one or more targeting criteria specified by the advertiser. Targeting criteria included in an ad request specify one or more characteristics of users eligible to be presented with advertisement content in the ad request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users who have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows advertisers to further refine users eligible to be presented with advertisement content from an ad request. As another example, targeting criteria identifies users having a connection to another user or object or having a particular type of connection to another user or object.

The content selection module 235 selects one or more content items for communication to a client device 110 to be presented to a user. Content items eligible for presentation to the user are retrieved from the content store 210, from the ad request store 230, or from another source by the content selection module 235, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 235 includes content items eligible for presentation to the user in one or more selection processes, which identify a set of content items for presentation to the viewing user. For example, the content selection module 235 determines measures of relevance of various content items to the user based on characteristics associated with the user by the online system 140 and based on the user's affinity for different content items. Information associated with the user and included in the user profile store 205, in the action log 220, and in the edge store 225 may be used to determine the measures of relevance. Based on the measures of relevance, the content selection module 235 selects content items for presentation to the user. As an additional example, the content selection module 235 selects content items having the highest measures of relevance or having at least a threshold measure of relevance for presentation to the user. Alternatively, the content selection module 235 ranks content items based on their associated measures of relevance and selects content items having the highest positions in the ranking or having at least a threshold position in the ranking for presentation to the user.

Content items selected for presentation to the user may include ad requests or other content items associated with bid amounts. The content selection module 235 uses the bid amounts associated with ad requests when selecting content for presentation to the user. In various embodiments, the content selection module 235 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the online system 140 for presenting an ad request or a content item. For example, the expected value associated with an ad request is a product of the ad request's bid amount and a likelihood of the user interacting with the ad content from the ad request. The content selection module 235 may rank ad requests based on their associated bid amounts and select ad requests having at least a threshold position in the ranking for presentation to the user. In some embodiments, the content selection module 235 ranks both content items not associated with bid amounts and ad requests in a unified ranking based on bid amounts associated with ad requests and measures of relevance associated with content items and ad requests. Based on the unified ranking, the content selection module 235 selects content for presentation to the user. Selecting ad requests and other content items through a unified ranking is further described in U.S. patent application Ser. No. 13/545,266, filed on Jul. 10, 2012, which is hereby incorporated by reference in its entirety.

For example, the content selection module 235 receives a request to present a feed of content (also referred to as a "content feed") to a user of the online system 140. The feed may include one or more advertisements as well as content items, such as stories describing actions associated with other online system users connected to the user. The content selection module 235 accesses one or more of the user profile store 205, the content store 210, the action log 220, and the edge store 225 to retrieve information about the user. For example, stories or other data associated with users connected to the identified user are retrieved. Additionally, one or more ad requests may be retrieved from the ad request store 230 The retrieved stories, ad requests, or other content items are analyzed by the content selection module 235 to identify candidate content items that are likely to be relevant to the identified user. For example, stories associated with users not connected to the identified user or stories associated with users for which the identified user has less than a threshold affinity are discarded as candidate content items. Based on various criteria, the content selection module 235 selects one or more of the candidate content items or ad requests identified as candidate content items for presentation to the identified user. The selected content items or advertisements from selected ad requests are included in a feed of content that is presented to the user. For example, the feed of content includes at least a threshold number of content items describing actions associated with users connected to the user via the online system 140.

In various embodiments, the content selection module 235 presents content to a user through a feed including a plurality of content items selected for presentation to the user. One or more advertisements may also be included in the feed. The content selection module 235 may also determine the order in which selected content items or advertisements are presented via the feed. For example, the content selection module 235 orders content items or advertisements in the feed based on likelihoods of the user interacting with various content items or advertisements.

The feed of content generated by the content selection may include one or more content items including a link that, when interacted with by the user, cause installation of an application (e.g., a computer game, a shopping application, a navigation application, etc.) on a client device 110 presenting the feed of content. Multiple content items and advertisements may be presented in the feed along with a content item including the link for installing the application. As described above, content items included in the feed may be content items, such as advertisements, for which the online system 140 receives compensation in exchange for presenting ("sponsored content items) as well as content items for which the online system 140 does not receive compensation in exchange for presenting ("organic content items"). In various embodiments, the link for installing the application on the client device 110 identifies a landing page or other content external to the online system 140, such as instructions for execution by the client device 110, for retrieving and installing the application on the client device 110. In some embodiments, the link for retrieving and installing the application on the client device 110 is included in advertisement content included in an ad request for an application. In various embodiments, when the user selects the link via any suitable interaction (e.g., tactile gesture, selection with a cursor, etc.), the client device 110 retrieves information identified by the link and executes at least a portion of the retrieved information to install the application on the client device 110

Figure 3:
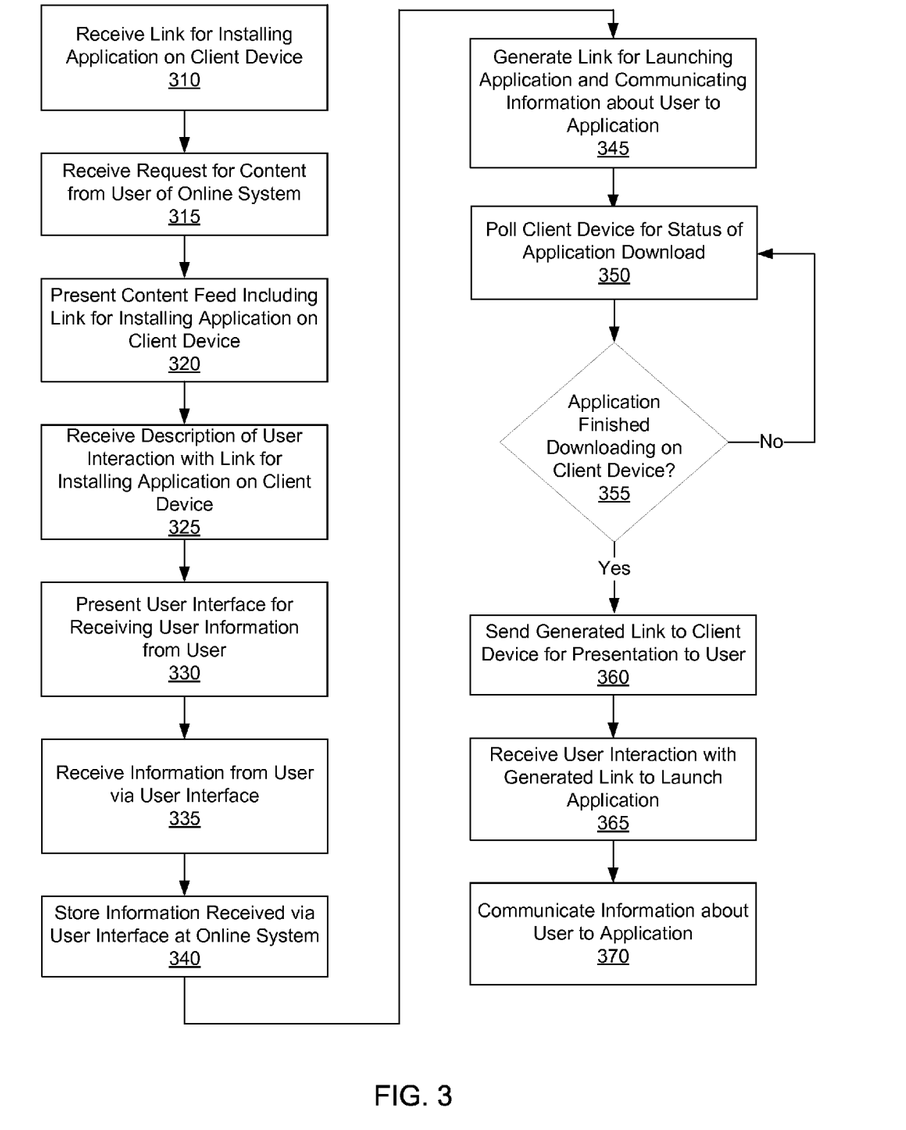
FIG. 3 is a flowchart of a method for registering an online system user to an application while the application is retrieved by a client device, in accordance with an embodiment.
Figure 4A:
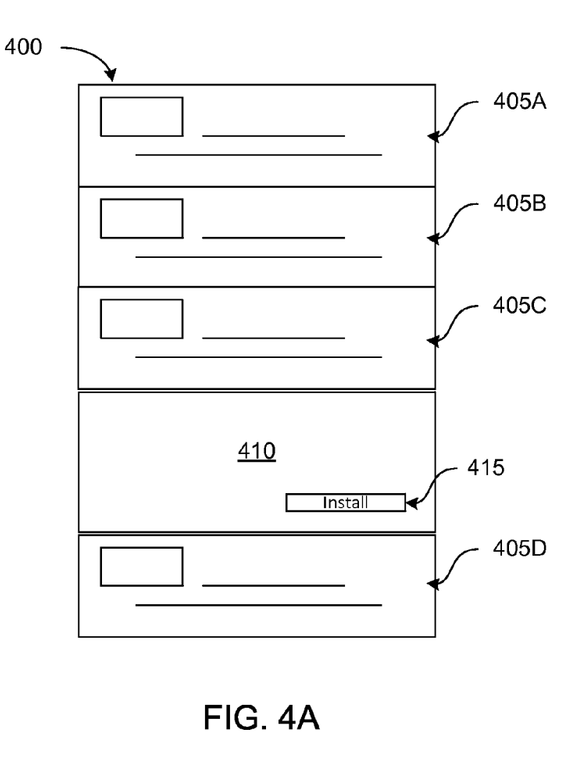
FIG. 4A is an example content feed including a link for retrieving and installing an application on a client device, in accordance with an embodiment.
Figure 4B:
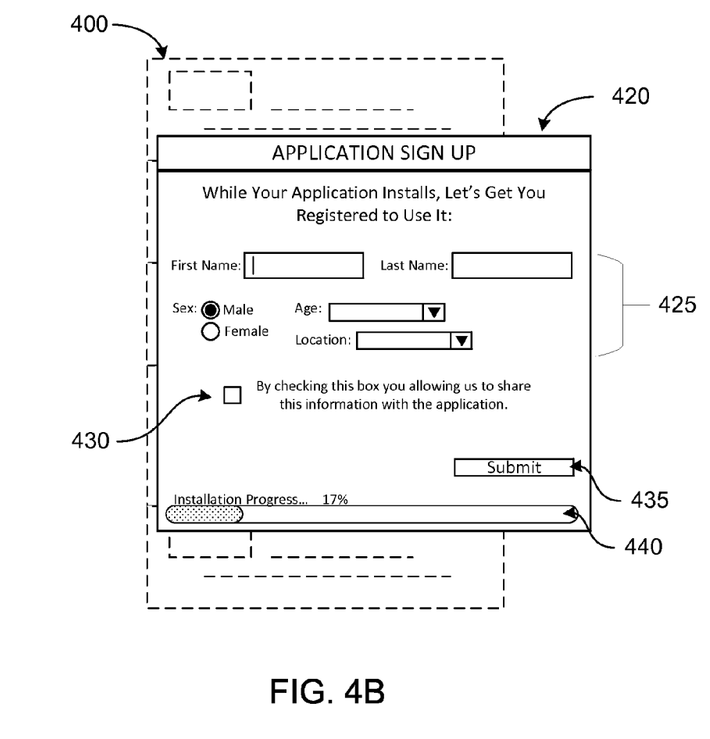
FIG. 4B is an example user interface for receiving information from an online system user to use an application while the application is retrieved and installed on the client device, in accordance with an embodiment.
Figure 4C:
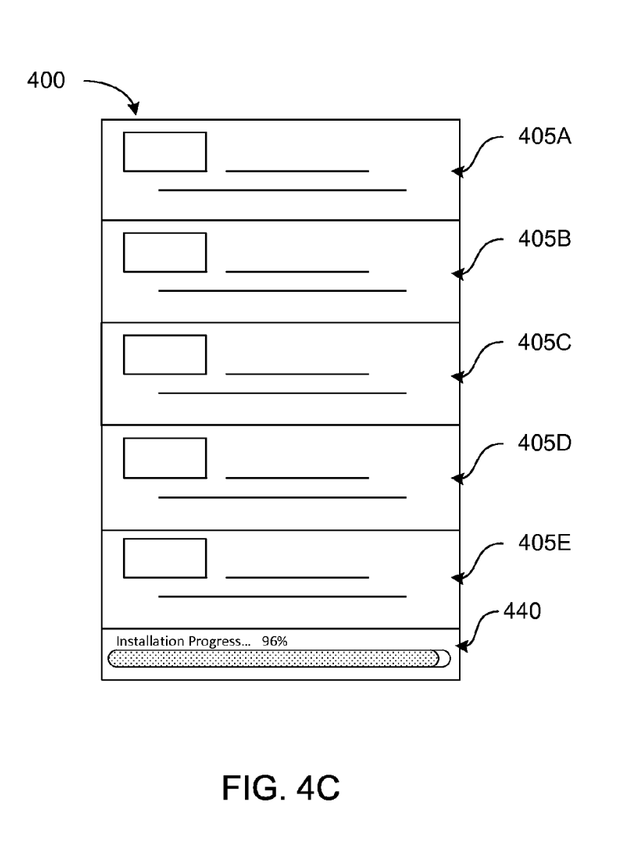
FIG. 4C is an example content feed including an indication of a status of retrieval and installation of an application on a client device after information about the user has been received by an online system, in accordance with an embodiment.
Figure 4D:
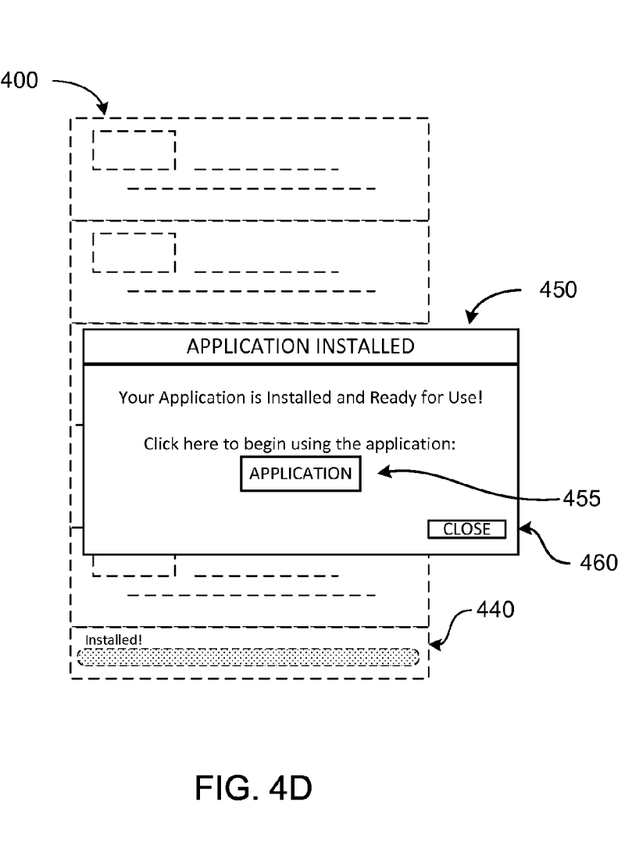
FIG. 4D is an example interface presenting an online system user with a link for launching an application and communicating information received from the user to the application, in accordance with an embodiment.

As further described in conjunction with FIGS. 3-4D, the content selection module 235 may generate a user interface for presentation to the user in response to the user selecting the link. The user interface is communicated to a client device 110 from which the link was selected for presentation to the user while the client device retrieves and installs the application. In other embodiments, the content selection module 235 retrieves a user interface provided to the online system 140 from a third party system 130 (e.g., an application developer) for presentation to the user via the client device 110 while the client device 110 retrieves and installs the application. Information received via the user interface may be communicated by the online system 140 to the application or to a third party system 130 associated with the application as further described in conjunction with FIG. 3.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, WEBOS® or BlackberryOS.

Registering an Online System User for Using an Application During Application Download FIG. 3 is a flowchart of one embodiment of a method for registering an online system user for using an application during an application download. In other embodiments, the method may include different and/or additional steps than those shown in FIG. 3. Additionally, steps of the method may be performed in different orders than the order described in conjunction with FIG. 3 in various embodiments.

The online system 140 receives 310 a link for installing an application (e.g., a game application, a shopping application, a navigation application, etc.) on a client device 110 associated with a user of the online system 140 from an additional user of the online system 140, such as a third party system 130 associated with the application. For example, a link for installing an application on a client device 110 is included in an advertisement of an ad request submitted received by the online system 140 from an advertiser, an application developer, or another third party system 130. In various embodiments, the link for installing the application on the client device 110 is included in an advertisement from an ad request and identifies a third party system 130 external to the online system 140 from which information for installing the application may be retrieved (e.g., an application store or other application distributor). For example, the link identifies instructions maintained by a third party system 130 that, when retrieved and executed by a client device 110, install the application on the client device 110. In other embodiments, the link may be included in a content item describing an action performed by a user of the online system 140, such as content item describing a user's installation of the application or the user's interaction with the application. Hence, the link may be included in an organic content item for which the online system 140 does not subsequently receive compensation in exchange for presenting.

The online system 140 receives 315 a request from a user of the online system 140 to present a feed of content to the user. For example, the online system 140 receives 315 a request from a client device 110 associated with the user to present a feed of content via the client device 110. As another example, the online system 140 receives 315 a request from a client device 110 associated with the user to refresh a feed of content presented by the client device 110 with additional content items or advertisements selected for the user by the online system 140.

In response to receiving 315 the request to present the feed of content to the user, the online system 140 generates and presents 320 the feed of content to the user. The feed presented 320 to the user includes various content items, which may include advertisements, with a content item including the link for installing the application on the client device 110. In various embodiments, the online system 140 generates a feed of sponsored and/or organic content items selected for presentation to the user based on attributes of the content items and characteristics of the user and sends the feed of content items to a client device 110 associated with the user for presentation to the user on the client device 110. The feed of content may include organic content items for which the online system 140 does not receive compensation in exchange for presenting as well as sponsored content items, such as advertisements, for which the online system 140 receives compensation in exchange for presenting. Selection of content for inclusion in the feed of content is further described above in conjunction with FIG. 2.

In some embodiments, a content item included in the feed includes the link for installing the application on the client device 110. The link may be included in an advertisement for the application that is included in the feed of content. For example, the link is a clickable image, a text box, a button, or another interface element presented by an advertisement that references content external to the online system 140 that, when retrieved and executed by a client device 110, install the application on the client device 110 presenting the advertisement. For example, FIG. 4A shows an example feed of content 400 presented 320 by the online system 140 to a user via a client device 110. In the example of FIG. 4A, the feed of content 400 includes a plurality of organic content items 405A-D and a sponsored content item 410 that includes a link 415 for installing an application on the client device 110 presenting the feed of content 400. In other embodiments, the link 415 for installing the application on the client device 110 may be presented to the user in an organic content item 405 or may be presented in a location of the feed of content 400 that is outside of a content item, such as in a specific portion of the feed that presents recommendations of actions for the user to perform. In some embodiments, the link 415 for installing the application on the client device 110 may be presented to the user outside of the feed of content 400, such as when the user is logged in to the online system 140 but interacting with content external to the online system (e.g., performing a search query via a web browser).

While the online system 140 presents the feed of content 400 to the user, the online system 140 receives a request from the user to install the application on a client device 110 associated with the user, such as the client device 110 on which the link 415 is presented. For example, the online system 140 receives 325 a description of an interaction by the user with the link 415 included in the content feed 400 to install the application on the client device 110 presenting the content feed 400 to the user. Example user interactions with the link 415 include: cursor movements, mouse clicks, tactile gestures received via a touchscreen interface of the client device 110, or any other suitable interactions. Example tactile gestures received via a touchscreen interface include swiping, tapping, pressing, and contacting and holding pressure in an area on the touchscreen interface. In some embodiments, a request to install the application on a client device 110 presenting the feed of content 400 is received when the online system 140 receives information from the client device 110 or from an application executing on the client device 110 indicating the user has performed one or more types of interactions with a portion of a display area of the client device 110 displaying the link 415 for installing the application.

In some embodiments, receiving the description of the user interaction with the link, the online system 140 presents the user with an interface for retrieving and installing the application on the client device 110. For example, the online system 140 receives 325 a description of an interaction by the user with the link 415 included in the content feed 400 to install the application on the client device 110 and presents the interface for retrieving the application on the client device 110 to the user via the client device 110. In some embodiments, the interface includes information about the application and a link to retrieve content that, when executed, retrieves and installs the application on the client device 110. The interface for retrieving the application may be displayed in a portion of a display area of the client device 110 presenting the feed of content 400 to the user while the feed of content 400 is displayed. For example, a popup interface is superimposed on a portion of the feed of content 400 presented in a display area of the client device 110. The interface allows the user to view information about the application as well as a link to retrieve content for installing the application on the client device 110.

The interface for retrieving the application may be generated by a third party system 130 external to the online system 140 (e.g., an application distributor or an application developer) and provided to the online system 140 by the third party system 130 for presentation via the online system 140. For example, the interface is provided to the online system 140 by a third party system 130 for presentation to the user through an application associated with the online system 140 that executes on the client device 110. In some embodiments, the online system 140 presents the interface in conjunction with the feed of content 400 the user with the user interface alongside or superimposed on a portion of the feed of content 400 while continuing to present the feed of content 400. In some embodiments, the online system 140 requests the interface from a third party system 130 and allows the third party system 130 to communicate the request to the client device 110 for presentation by an application associated with the online system 140 and executing on the client device 110, subject to regulations or restrictions enforced by the online system 140. For example, the interface is generated by a third party system 130 and is presented to the user via an application presenting the feed of content 400 on the client device 110, allowing the third party system 130 to provide the interface that is presented in conjunction with the feed of content 400.

The online system 140 may receive 325 a description of a user interaction with the link or receive another request from the client device 110 to install the application when a content feed from the online system 140 is not presented by the client device 110. For example, the online system 140 receives 325 information from a client device 110 associated with the user (e.g., via an application executing on the client device 110) indicating the user has interacted with the link while the link to install the application is presented in an advertisement or other content on the client device 110. The link may be presented in an alternative application executing on the client device 110 that is not associated with the online system 140, and the alternative application communicates information identifying an interaction with the link to the online system 140.

If the online system 140 receives 325 information describing a user interaction with the link or otherwise receives a request from the user to install the application, the online system 140 communicates one or more instructions to the client device 110 to retrieve the application. For example, if the online system 140 receives 325 a description of an interaction by the user with the link to install the application, the online system 140, or an application executing on the client device 110 associated with the online system 140, communicates a request to install the application on the client device 110 to a third party system 130 (e.g., a distribution platform) associated with the application to initiate the download and installation of the application on the client device 110. Based on the instructions from the online system 140 or generated by an application associated with the online system 140 executing on the client device 110, the client device 110 retrieves content from the third party system 130, or from the online system 140, that, when executed by the client device 110, installs the application on the client device 110.

While the application is being retrieved by the client device 110, the online system 140 presents 330 the user with a user interface for receiving information about the user for accessing and using the application when it is installed on the client device 110. For example, the online system 140 sends a user interface to the client device 110 for presentation to the user while the application is being retrieved and/or installed by the client device 110. In various embodiments, the user interface is displayed in a portion of a display area of the client device 110 while the content feed 400 is also displayed in the display area of the client device 110. For example, a user interface (e.g., a popup interface) is superimposed on a portion of the feed of content 400 to receive information about the user for subsequent use in accessing and using the application while the feed of content 400 is presented in a display area of the client device 110 and while the client device 110 is retrieving the application. The feed of content 400 may be dynamically updated while the user interface is presented 330 to the user, in some embodiments. As another example, the user interface is presented 330 in a portion of the display area of the client device 110 while the feed of content 400 is concurrently presented in a different portion of the display area of the client device 110.

In various embodiments, the user interface is generated by the online system 140 to obtain information about the user that was requested by the application or by an entity associated with the application (e.g., a third party system 130 associated with the application). For example, a third party system 130 associated with the application provides an information request to the online system 140 along with an ad request associated with the application. As another example, the third party system 130 associated with the application provides the information request to the online system 140 along with information identifying the application, allowing the online system 140 to subsequently retrieve the information request when information identifying the application is received. In some embodiments, the online system 140 retrieves the information request when generating the user interface and generates the user interface based on information specified by the information request. In some embodiments, the online system 140 generates the user interface to obtain information requested by the application or by a third party system 130 associated with the application when the online system 140 receives an indication the client device 110 has begun retrieving the application. For example, the online system 140 receives an information request from the application or an entity associated with the application when the entity associated with the application begins providing data for installing the application to the client device 110; the information request may include information identifying the client device 110 or identifying the user to the online system 140. Upon receiving the information request, the online system 140 generates the user interface. In some embodiments, generated user interface requests information about the user in addition to information requested by the application or an entity associated with the application. For example, the user interface requests information from the user for use by the application as well as requests one or more permissions from the user to allow the online system 140 to share information associated with the user and maintained by the online system 140 with the application.

In other embodiments, a third party system 130 generates the user interface and provides the user interface to the online system 140 for presentation. For example, the user interface is generated by an application distributor and provided to the online system 140 in an ad request associated with the application or in other content associated with the application, allowing the online system 140 to subsequently retrieve and present the user interface upon receiving an indication that a client device 110 associated with the user is retrieving and installing the application. As another example, the third party system 130 communicates the user interface to the online system 140 when the third party system 130 receives a request for the application from the client device 110, allowing the online system 140 to subsequently present 330 the user interface via the client device 110.

The user interface is configured to request and to receive information about the user for allowing the user to access and use the application, which is specified by an entity associated with the application. For example, the user interface is a user fillable form (e.g., an HTML form) including various fields in which the user provides information for communication to the online system 140 for allowing the user to access and use the application when it is installed on the client device 110. For example, the user interface is a popup window having multiple fields in which the user provides information to the online system 140 that is subsequently communicated to the application or to an entity associated with the application.

Information provided to the online system 140 via the user interface includes demographic information, interests of the user, contact information, identifying information, or any other suitable information. Different information provided via the user interface may allow a third party system 130 or other entity associated with the application to provide the user with additional functionality for the application, to modify the application, or to obtain characteristics of users who install and/or use the application. For example, a user provides demographic information to the online system 140 via the user interface to use a shopping application, which subsequently uses the demographic information to provide the user with age and gender specific product recommendations when the user interacts with the application.

One or more user interactions are associated with the user interface that, when received by the client device 110, allow the user to provide different information via the user interface. For example, different interactions allow the user to select different fields in the user interface to provide information via the different fields. Example user interactions include inputs via a keyboard or other input device, cursor movements, activation of an input device, and tactile gestures captured via an input device, such as a touch-sensitive display. Example tactile gestures include a gesture traversing a path of a region of a display area of a client device 110 presenting the user interface, contacting a region of a display area of the client device 110 presenting the user interface for less than a threshold duration, and contacting a region of a display area of the client device 110 presenting the user interface for greater than the threshold duration. The user interface may include any suitable interface elements for receiving information from the user. Example interface elements include: textboxes, dropdown lists, radio buttons, and checkboxes. In some embodiments, the user interface includes additional interface elements such as navigational and informational components. Example navigational and informational components included in the user interface include: a text bar, an icon, a window, a frame, a section, a scroll bar, a tab, an image, a video, an audio file, a menu, a button, a message, a post, a hyperlink, and one or more interactive elements.

In various embodiments, the user interface is presented 330 to the user with one or more fields of the user interface are automatically prefilled by the online system 140 based on information associated with the user by the online system 140. For example, certain information associated with the user and stored by the online system 140 (e.g., a name, demographic information, a location, an email address, a physical address) is retrieved from a user profile associated with the user by the online system 140 and included in corresponding fields of the user interface when the user interface is presented 330 to the user. The user may accept the information included in the fields by the online system or may modify information included in one or more fields of the user interface by the online system 140.

In various embodiments, the user interface also allows the user to provide the online system 140 one or more permissions to share information provided via the user interface or otherwise associated with the user (e.g., demographic information, actions performed by the user, connections between the user and other users, etc.) with the application or with a third party system 130 after the application is installed on the client device 110. In some embodiments, the user interface includes one or more fields for allowing the user to specify permissions for the online system 140 to share information about the user with the application or with an entity associated with the application. For example, the user interface includes a checkbox that the user may select or deselect to, respectively, grant or deny the online system 140 permission to share certain information about the user provided in the user interface with the application. In some embodiments, the user interface also allows the user to grant the online system 140 permissions to share additional information maintained by the online system 140 and associated with the user with the application or with the third party system 130. For example, the user interface includes various fields identifying various types of information associated with the user and maintained by the online system 140 and authorization statements that, when selected by the user, provide the online system 140 with permission to share a type of information associated with an authorization statement to with the application or with the third party system 130.

When the user performs one or more interactions with the user interface via the client device 110, information received by the user interface is communicated to the online system 140. For example, the user interface includes a button or other interface element that, when accessed by the user, communicates information received by the user interface to the online system 140. Additionally, one or more interactions with the user interface may close the user interface. For example, interacting with a specific interface element in the user interface closes the user interface, which halts presentation 330 of the user interface. In some embodiments, closing the user interface communicates information included in the user interface to the online system 140. If no information is provided in the user interface when the interface is closed, the user interface may be later presented again to the user in some embodiments.

In the example of FIG. 4B, the client device 110 is retrieving the application, so a user interface 420 with various input fields 425 is presented 330 to the user. As shown in FIG. 4B, the user interface 420 is superimposed on a portion of the content feed 400 presented in the display area of the client device 110 for receiving information about the user for accessing and using the application. For example, the user interface 420 includes input fields 425 for the user to provide a first name, a last name, an age, and a location of the user. Additionally, the user interface 420 in FIG. 44B includes an option 430 to authorize the online system 140 to share the information provided in the input fields 425 with the application if the option 430 is selected. An interface element 435 is included in the user interface 420 communicates information provided in the user interface 420 to the online system 140 when accessed by the user. As further described below, the user interface 420 may also include a progress bar 440 describing the status of the installation of the application on the client device 110. For example, in FIG. 4B, the progress bar 440 indicates that the installation of the application is 17% complete.

The online system 140 receives 335 and stores 340 the information provided by the user via the user interface 420. For example, the online system receives 335 the information provided by the user through the user interface 420 when the user interacts with an interface element 435 included in the user interface 420 to transmit the information to the online system 140. The online system 140 stores 340 the received information in association with the user. In some embodiments, the online system 140 stores 340 the received information in a user profile associated with the user. As further described above, the received information may include one or more permissions authorizing the online system 140 to share the information provided in the user interface 420 or additional information maintained on the online system 140 about the user with the application or with a third party system 130 associated with the application. In some alternative embodiments, an application associated with the online system 140 and executing on the client device 110 stores 340 information received via the user interface on the client device 110.

After the online system 140 receives 335 the information provided by the user via the user interface 420 is received 335, the online system 140 may close the user interface 420 to continue presenting the content feed 400 to the user. For example, as shown in FIG. 4C, after the user interface 420 is closed, the content feed 400 is refreshed to include an additional content item 405E in place of the content item 410 that previously presented the link 415 for installing the application on the client device 110. As described in more detail below, the refreshed content feed 400 may include a progress bar 440, or other information, describing the status of the installation of the application on the client device 110. For example, in FIG. 4C, the progress bar 440 indicates that the installation of the application is 96% completed.

When the online system 140 has received 335 and stored 340 the information provided by the user via the user interface 420, the online system 140 generates 345 a link for launching the application on the client device 110 and communicating the information provided via the user interface 420 to the application. The generated link includes instructions that, when executed by the client device 110, launches the application on the client device 110 on which the application is being retrieved and installed. For example, the online system 140 generates a deep link the application that includes an identifier associated with the application and one or more instructions for execution by the application to configure the application to a specific state. A state of the application identifies data received by the application as well as data presented by the application.

In various embodiments, the generated link for launching the application includes information provided to the online system 140 via the user interface 420 (or other information about the user), allowing information from the user interface to be communicated to the application when the user interacts with the link to launch the application. For example, the online system 140 generates 345 a uniform resource locator (URL) for launching the application, where variables identified in the URL identify information received 335 by the online system 140 via the user interface 420. Different amounts of information from the user interface 420 received 335 by the online system 140 may be included in the link, allowing different links to include different amounts of information about the user.

In some embodiments, the generated link for launching the application includes authentication information granting the application one or more permissions for retrieving information about the user from the online system 140. For example, the online system 140 generates an access token associated with one or more permissions granted to the application for retrieving certain information about the user from the online system 140, such as one or more permissions for the online system 140 to share certain information identified via the user interface 420 with the application or an entity associated with the application. For example, if the user granted the online system 140 permission to share only demographic information with the application via the user interface 420, the access token indicates the online system 140 is only authorized to share demographic information about the user with the application. Including the access token in the link allows communication of the access token to the application when the user interacts with the link for launching the application on the client device 110.

The online system may poll 350 the client device 110 in various embodiments to determine 355 whether retrieval or installation of the application on the client device 110 has completed. For example, the online system 140 communicates requests to the client device 110 when the online system 140 receives 325 the description of the user interacting with the like for installing the application and communicates requests to the client device 110 at periodic intervals until the online system 140 receives a response to a request from the client device 110 indicating the application has been installed. Responses to the requests may specify an amount or percentage of the application that has been received or that has been installed, allowing the online system 140 to determine 355 the status of the download and installation of the application on the client device 110. In various embodiments, an operating system executing on the client device 110, such as a native operating system of the client device 110, communicates responses to the requests to the online system 140.

In some embodiments, the online system 140 presents the user with an icon or graphic based on responses received from the online system 140 from polling 350 the client device 110 to provide the user with updated information about the progress of retrieval or installation of the application on the client device 110. For example, as illustrated in FIG. 4B, the online system 140 presents the user with a dynamically updated progress bar 440 in the user interface 420, allowing the user to determine progress of retrieval and installation of the application while providing information via the user interface 420. FIG. 4C shows another example where the online system 140 presents the user with a progress bar 440 while presenting the content feed 400 to the user after the user has submitted information provided in the user interface 420 to the online system 140 and while the application continues to be retrieved installed on the client device 110. As another example, shown in FIG. 4D, the online system 140 continues presenting a progress bar 440 in a portion of a display area on the client device 110 while the content feed 400 is being presented to the user after the online system 140 determines 355 retrieval and installation of the application on the client device has completed.

When the online system determines 355 retrieval and installation of the application on the client device 110 has completed, the online system 110 sends 360 the generated link for launching the application to the client device 110 for presentation to the user. For example, as illustrated in FIG. 4D, the online system 140 presents a window 450 in a portion of a display area on the client device 110 (e.g., superimposed on a portion of the content feed 400) to indicate the application has been installed and to present the user with the generated link 455 for launching the application. As further described above, the generated link 455 for launching the application may also communicate information about the user to the application. The window 450 and generated link 455 for launching the application are associated with one or more user interactions for launching the application. For example, the user launches the application and communicates information about the user to the application by interacting with the generated link 455 for launching the application. The window 450 may also include one or more additional interface elements allowing the user to close or dismiss the window 450 without launching the application. For example, if the online system 140 receives a user interaction with a particular interface element 460, the online system 140 closes the window 450. In some embodiments, if the user closes the window without selecting the generated link 455 for launching the application, the online system 140 presents the generated link 455 for launching the application in conjunction with the content feed 400. For example, the generated link 455 is presented as a content item within the content feed 400 or is presented proximate to the content feed 400.

If the online system 140 receives 365 an interaction by the user with the link 455 for launching the application, the online system 140 communicates one or more instructions to the client device 110 that, when executed by the client device 110, launch the application on the client device 110 and communicate 370 information about the user included in the generated link 455 for launching the application to the application. The instructions for launching the application may be included in the generated link 455 for launching the application, so the client device 110 executes the instructions when the user selects the generated link 455 for launching the application. In various embodiments, the information communicated 370 to the application via the link 455 for launching the application is at least a set of the information provided to the online system 140 via the user interface 420 presented during retrieval and installation of the application by the client device 110. The application may use the information to register or authorize the user to access and to use the application. In some embodiments, the application is launched to a state that presents information based at least in part on the information.

Information communicated 370 to the application may include authentication information that allows the application to obtain information about the user from the online system 140. In some embodiments, the application communicates a request for information about the user to the online system 140 that includes authentication information communicated 370 to the application when the generated link 455 for launching the application was accessed. The online system 140 determines whether the authentication information permits the online system 140 to provide information specified by the request to the application. If the authentication information permits the online system 140 to provide the application with the information specified by the request, the online system 140 communicates 370 the information specified by the request to the application. The online system 140 compares authentication information included in the request for information with information stored by the online system 140 authorizing communication of information about the user and communicates 370 the information included in the request if the authentication information included in the request matches information stored by the online system authorizing communication of information about the user.

In various embodiments, the authentication information included in the generated link 455 for launching the application is an access token that is communicated 370 to the application when the application is launched when the generated link 455 for launching the application is selected. The application uses the access token when requesting information about the user from the online system 140. For example, the application includes the access token in requests for information about the user communicated from the application to the online system 140. Depending on one or more permissions associated with the access token, the online system 140 determines whether to communicate 370 the requested information to the application. In some embodiments, permissions associated with the access token allow the application to obtain information about the user stored by the online system 140 and use the information stored by the online system to allow the user to access the application.

The online system 140 may communicate a subset of the information provided by the user via the user interface 420 or the complete set of the information provided by the user via the user interface 420. Privacy settings specified by the user and maintained by the online system 140 regulate the information from the user interface 420 provided to the application in various embodiments. For example, privacy settings specified by the user to the online system 140 authorize the online system 140 to provide the application with interests associated with the user but not to provide the application with demographic information about the user.

Additionally, the online system 140 may provide additional information about the user to the application in addition to at least a subset of the information provided by the user via the user interface 420. For example, information provided to the application may include information describing actions performed by the user and logged by the online system 140 if the user has provided the online system 140 with permissions to provide information describing the user's actions with the application. As another example, information provided by the online system 140 to the application identify connections between the user and additional users of the online system 140 if the user has provided the online system 140 with permissions to identify connections between the user and other users of the online system 140 to the application.

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at an online system, a user interaction with a content item in a content feed, the user interaction including a request to install an application on a client device associated with a user of the online system;

initiating retrieval of the application to the client device in response to the request;

during retrieval of the application, presenting a user interface to the user on the client device, the user interface comprising a user-fillable form configured to receive user-provided information about the user for use by the application and to receive one or more permissions to enable the application to retrieve profile information about the user from the online system;

responsive to receiving the user-provided information about the user via the user interface, storing the received user-provided information at the online system;

generating an access token associated with the one or more permissions to enable the application to retrieve the profile information about the user from the online system;

generating a link for launching the application on the client device, the link including the access token and including the user-provided information about the user received via the user interface, wherein the link, when accessed, enables communication of the access token and the user-provided information to the application;

determining retrieval of the application to the client device has completed;

responsive to determining retrieval of the application to the client device has completed, presenting a window including the link to the client device;

responsive to receiving an indication that the user closed the window, presenting the link in conjunction with the content feed;

receiving from the application, the access token and a request to retrieve the profile information about the user from the online system;

authenticating, based on the one or more permissions associated with the access token, that the application is permitted to receive the profile information; and responsive to authenticating that the application is permitted to receive the profile information, providing the profile information to the application.

2. The method of claim 1, wherein determining retrieval of the application to the client device has completed comprises:

sending a request to the client device for status information describing a status of retrieval of the application to the client device;

receiving the status information describing the status of retrieval of the application to the client device; and determining retrieval of the application to the client device has completed based at least in part on the received status information.

3. The method of claim 1, wherein responsive to determining retrieval of the application to the client device has completed, presenting the window including the link to the client device comprises:

presenting the window including the link to the client device in response to determining the application has been installed on the client device.

4. The method of claim 3, wherein presenting the window including the link to the client device in response to determining the application has been installed on the client device comprises:

sending a request to the client device for status information describing a status of installation of the application on the client device;

receiving the status information describing the status of installation of the application on the client device;

determining the application has been installed on the client device based at least in part on the received status information; and presenting the window including the link to the client device in response to the determining.

5. The method of claim 1, wherein the user-Tillable form comprises a plurality of fields for receiving the user-provided information about the user.

6. The method of claim 5, wherein one or more of the plurality of fields are automatically populated with data stored by the online system.

7. The method of claim 1, wherein the link for launching the application comprises a deep link that includes an identifier associated with the application and one or more instructions for execution by the application to configure the application to a specific state.

8. A computer program product comprising a non-transitory computer readable storage medium having instructions encoded thereon that, when executed by a processor, cause the processor to:

receive, at an online system, a user interaction with a content item in a content feed, the user interaction including a request to install an application on a client device associated with a user of the online system;

initiate retrieval of the application to the client device in response to the request;

during retrieval of the application, present a user interface to the user on the client device, the user interface comprising a user-fillable form configured to receive user-provided information about the user for use by the application and to receive one or more permissions to enable the application to retrieve profile information about the user from the online system;

responsive to receiving the user-provided information about the user via the user interface, store the received user-provided information at the online system;

generate an access token associated with the one or more permissions to enable the application to retrieve the profile information about the user from the online system;

generate a link for launching the application on the client device, the link including the access token and including the user-provided information about the user received via the user interface, wherein the link, when accessed, enables communication of the access token and the user-provided information to the application;

determine retrieval of the application to the client device has completed;

responsive to determining retrieval of the application to the client device has completed, presenting a window including the link to the client device;

responsive to receiving an indication that the user closed the window, present the link in conjunction with the content feed;

receive from the application, the access token and a request to retrieve the profile information about the user from the online system;

authenticate, based on the one or more permissions associated with the access token, that the application is permitted to receive the profile information; and responsive to authenticating that the application is permitted to receive the profile information, provide the profile information to the application.

9. The computer program product of claim 8, wherein the instructions to determine retrieval of the application to the client device has completed comprises instruction that cause the processor to:

send a request to the client device for status information describing a status of retrieval of the application to the client device;

receive the status information describing the status of retrieval of the application to the client device; and determine retrieval of the application to the client device has completed based at least in part on the received status information.

10. The computer program product of claim 8, wherein the user-Tillable form comprises a plurality of fields for receiving the user-provided information about the user.

11. The computer program product of claim 10, wherein one or more of the plurality of fields are automatically populated with data stored by the online system.

12. The computer program product of claim 8, wherein the link for launching the application comprises a deep link that includes an identifier associated with the application and one or more instructions for execution by the application to configure the application to a specific state.

13. A computer system comprising:

a processor; and a non-transitory computer readable storage medium having instructions encoded thereon that, when executed by a processor, cause the processor to:

receive, at an online system, a user interaction with a content item in a content feed, the user interaction including a request to install an application on a client device associated with a user of the online system;

initiate retrieval of the application to the client device in response to the request;

during retrieval of the application, present a user interface to the user on the client device, the user interface comprising a user-Tillable form configured to receive user-provided information about the user for use by the application and to receive one or more permissions to enable the application to retrieve profile information about the user from the online system;

responsive to receiving the user-provided information about the user via the user interface, store the received user-provided information at the online system;

generate an access token associated with the one or more permissions to enable the application to retrieve the profile information about the user from the online system;

generate a link for launching the application on the client device, the link including the access token and including the user-provided information about the user received via the user interface, wherein the link, when accessed, enables communication of the access token and the user-provided information to the application;

determine retrieval of the application to the client device has completed;

responsive to determining retrieval of the application to the client device has completed, presenting a window including the link to the client device;

responsive to receiving an indication that the user closed the window, present the link in conjunction with the content feed;

receive from the application, the access token and a request to retrieve the profile information about the user from the online system;

authenticate, based on the one or more permissions associated with the access token, that the application is permitted to receive the profile information; and responsive to authenticating that the application is permitted to receive the profile information, provide the profile information to the application.

14. The computer system of claim 13, wherein the instructions to determine retrieval of the application to the client device has completed comprise instructions that cause the processor to:

sending a request to the client device for status information describing a status of retrieval of the application to the client device;

receiving the status information describing the status of retrieval of the application to the client device; and determining retrieval of the application to the client device has completed based at least in part on the received status information.

15. The computer system of claim 13, wherein the user-fillable form comprises a plurality of fields for receiving the user-provided information about the user.

16. The computer system of claim 15, wherein one or more of the plurality of fields are automatically populated with data stored by the online system.

17. The computer system of claim 13, wherein the link for launching the application comprises a deep link that includes an identifier associated with the application and one or more instructions for execution by the application to configure the application to a specific state.

* * * * *